United States Patent
Lee

(10) Patent No.: US 9,701,317 B2
(45) Date of Patent: Jul. 11, 2017

(54) APPARATUS FOR DISPLAYING ENGINE RPM

(71) Applicants: HYUNDAI MOTOR COMPANY, Seoul (KR); Kia Motors Corporation, Seoul (KR)

(72) Inventor: Kang Ho Lee, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 188 days.

(21) Appl. No.: 14/670,388

(22) Filed: Mar. 26, 2015

(65) Prior Publication Data

US 2016/0152242 A1  Jun. 2, 2016

(30) Foreign Application Priority Data

Dec. 1, 2014 (KR) ........................ 10-2014-0170000

(51) Int. Cl.
  *B60W 40/12* (2012.01)
  *B60W 50/14* (2012.01)
  *B60K 35/00* (2006.01)

(52) U.S. Cl.
  CPC ............ *B60W 40/12* (2013.01); *B60K 35/00* (2013.01); *B60W 50/14* (2013.01); *B60K 2350/1096* (2013.01); *B60W 2050/146* (2013.01); *B60W 2400/00* (2013.01)

(58) Field of Classification Search
  None
  See application file for complete search history.

(56) References Cited

U.S. PATENT DOCUMENTS

| 7,125,363 | B2 * | 10/2006 | Shim | B60W 10/04 477/107 |
| 2005/0200463 | A1 * | 9/2005 | Situ | B60K 37/02 340/438 |
| 2012/0029837 | A1 * | 2/2012 | Katoh | B60K 35/00 702/33 |
| 2014/0229076 | A1 * | 8/2014 | Doering | F16H 63/42 701/48 |
| 2015/0109756 | A1 * | 4/2015 | Choi | B60K 37/02 362/23.01 |

(Continued)

FOREIGN PATENT DOCUMENTS

| JP | 06-10030 U | 2/1994 |
| JP | 2004-325108 A | 11/2004 |
| JP | 2009-220678 A | 10/2009 |

(Continued)

OTHER PUBLICATIONS

Korean Notice of Allowance issued in Application No. 10-2014-0170000 dated May 26, 2016.

(Continued)

*Primary Examiner* — Justin Holmes
(74) *Attorney, Agent, or Firm* — McDermott Will & Emery LLP

(57) ABSTRACT

An apparatus for displaying an engine RPM includes an ECU and a TCU configured to output a shift signal and a virtual RPM signal based on a shift state of a transmission. A cluster is configured to output the engine RPM as any one of the virtual RPM signal and a general RPM signal depending on whether the shift signal is input.

6 Claims, 1 Drawing Sheet

(56) References Cited

U.S. PATENT DOCUMENTS

2015/0151754 A1* 6/2015 Han ................ B60W 30/16
                                                    701/96
2016/0107652 A1* 4/2016 Kim ................ B60K 35/00
                                                    701/54

FOREIGN PATENT DOCUMENTS

JP          2010-254120 A     11/2010
KR     20-1998-0044129 U       9/1998
KR     10-2001-0009246 A       2/2001

OTHER PUBLICATIONS

Korean Office Action issued in Application No. 10-2014-0170000 dated Jan. 11, 2016.

* cited by examiner

APPARATUS FOR DISPLAYING ENGINE RPM

CROSS-REFERENCE(S) TO RELATED APPLICATIONS

The present application claims the benefit of priority to Korean Patent Application Number 10-2014-0170000 filed on Dec. 1, 2014, the entire contents of which application are incorporated herein for all purposes by this reference.

TECHNICAL FIELD

The present disclosure relates to an apparatus for displaying an engine revolutions per minute (RPM) capable of maximizing engine RPM display responsiveness based on a shift state of a transmission.

BACKGROUND

A vehicle cluster receives a controller area network (CAN) signal for an engine RPM supplied from an engine control unit to display the engine RPM. The cluster displays the engine RPM, to which a damping coefficient is applied, based on the supplied CAN signal. Therefore, display responsiveness may be maximized within a range in which the engine RPM does not judder.

However, when a transmission of a vehicle upshifts, the engine RPM suddenly decreases, but a gauge of the cluster does not track the upshift of the transmission due to the damping coefficient applied to prevent the judder of the engine RPM. Therefore, display responsiveness is not optimized.

The matters described as the related art have been provided only for assisting in the understanding for the background of the present disclosure and should not be considered as corresponding to the related art known to those skilled in the art.

SUMMARY

An aspect of the present inventive concept is directed to an apparatus for displaying an engine RPM capable of improving engine RPM output responsiveness of a cluster by allowing the cluster to output a virtual RPM when a transmission is in an up shift state.

Other objects and advantages of the present disclosure can be understood by the following description, and become apparent with reference to the embodiment of the present inventive concept. Also, it is obvious to those skilled in the art to which the present disclosure pertains that the objects and advantages of the present disclosure can be realized by the means as claimed and combinations thereof.

In accordance with an embodiment of the present inventive concept, an apparatus for displaying an engine RPM includes an engine control unit (ECU) and a transmission control unit (TCU) which is configured to output a shift signal and a virtual RPM signal based on a shift state of a transmission. A cluster is configured to output the engine RPM as any one of the virtual RPM signal and a general RPM signal depending on whether the shift signal is input.

The TCU may output the shift signal and the virtual RPM signal to the cluster when the shift state is upshifted.

The cluster may output the virtual engine RPM based on the virtual RPM signal when the shift signal is input.

The virtual engine RPM may be a value set to track a target engine RPM from a current engine RPM as a preset gradient, and the target engine RPM may be lower than the current engine RPM.

The cluster may receive the general RPM signal from the ECU and output an actual engine RPM based on the general RPM signal when the shift signal is not input.

The virtual engine RPM output from the cluster based on the virtual RPM signal may be lower than the actual engine RPM output from the cluster based on the general RPM signal.

According to the exemplary embodiment of the present inventive concept having the structure as described above, it is possible to improve the marketability of the vehicle by maximizing the engine RPM display responsiveness depending on the shift state of the transmission so as to allow the driver to visually confirm the ideal engine RPM.

DETAILED DESCRIPTION

Hereinafter, an apparatus for displaying an engine RPM according to an exemplary embodiment of the present inventive concept will be described with reference to the accompanying drawings.

Figure 1:
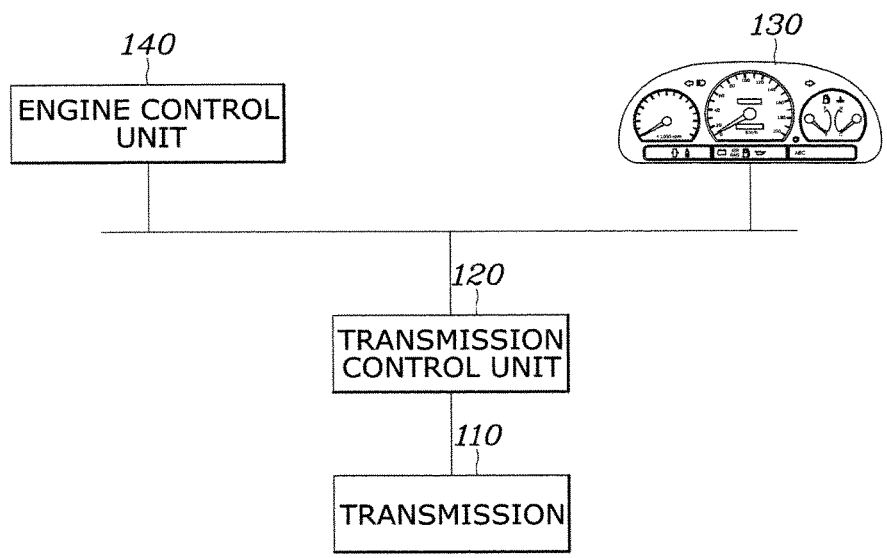
FIG. 1 is a block diagram illustrating an apparatus for displaying an engine RPM according to an exemplary embodiment of the present inventive concept.
Figure 2:
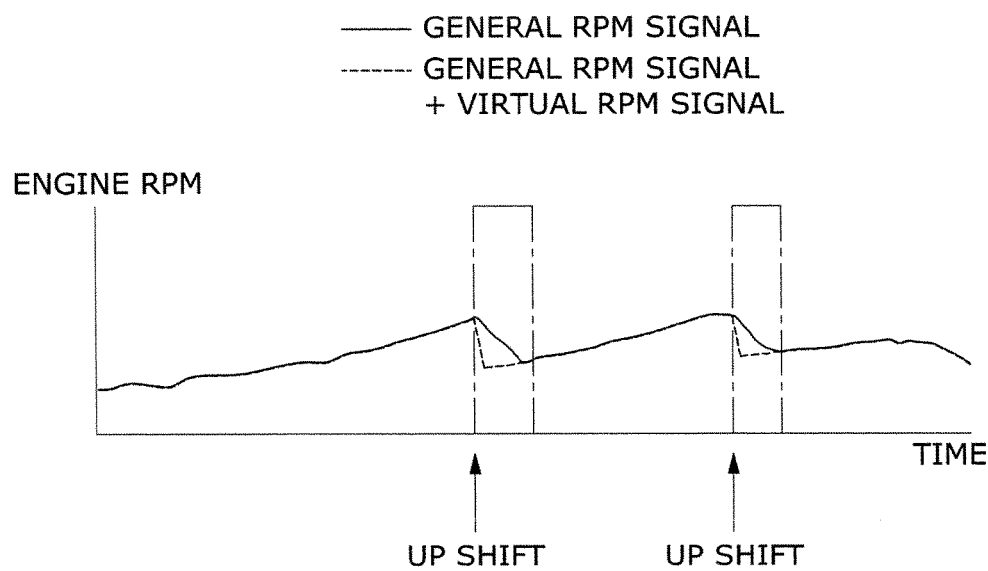
FIG. 2 is a graph illustrating a difference between an actual RPM and a virtual RPM according to an exemplary embodiment of the present inventive concept.

FIG. 1 is a block diagram illustrating an apparatus for displaying an engine RPM according to an exemplary embodiment of the present inventive concept, and FIG. 2 is a graph illustrating a difference between an actual RPM and a virtual RPM according to an exemplary embodiment of the present inventive concept. Referring to FIGS. 1 and 2, an apparatus for displaying an engine RPM may include a transmission control unit (TCU) 120 configured to output a shift signal and a virtual RPM signal based on a shift state of a transmission 110 and a cluster 130 configured to output an engine RPM as any one of the virtual RPM signal or a general RPM signal depending on whether the shift signal is input. As illustrated in FIG. 1, the cluster 130 may be connected to the TCU 120 and an engine control unit (ECU) 140 via a communication bus terminal so as to provide CAN communication with the TCU 120 and the ECU 140.

The TCU 120 outputs the shift signal and the virtual RPM signal to the cluster 130 when the shift state is in an upshift state.

That is, according to the related art, the cluster 130 receives the general RPM signal from the ECU 140 independent of whether the transmission 110 performs the upshift. Therefore, the cluster 130 outputs the actual engine RPM which is subjected to damping processing depending on the general RPM signal over the entire section.

However, when the transmission 110 is in the upshift state, the engine RPM suddenly decreases. Since the engine RPM depending on the general RPM signal is subjected to the damping processing, it is difficult to track a suddenly decreasing engine RPM as described above.

First, the cluster 130 according to the exemplary embodiment of the present inventive concept may receive the general RPM signal from the ECU 140 and output the actual engine RPM based on the general RPM signal when the shift signal is not input. That is, when the transmission 110 is not upshifted, the cluster 130 may receive the actual RPM signal which is subjected to the damping processing to prevent judder of the engine RPM output from the cluster 130 from occurring.

To the contrary, the cluster 130 may output the virtual engine RPM based on the virtual RPM signal when the shift signal is input.

That is, when the transmission 110 is upshifted, the TCU 120 senses that the transmission 110 is upshifted to output the shift signal which is a signal instructing the cluster 130 to receive the virtual RPM signal. Further, the TCU 120 outputs the virtual RPM signal to allow the cluster 130 to output an ideal engine RPM which is not subjected to the damping processing, together with the shift signal.

In this case, the virtual engine RPM which is output from the cluster 130 is an RPM which is set to track a target engine RPM at a preset gradient from a current engine RPM, in which the target engine RPM may be lower than the current engine RPM. Here, the target engine RPM is an ideal value of the engine RPM which instantly decreases when the transmission 110 is in the upshift state.

Further, the virtual engine RPM output from the cluster 130 based on the virtual RPM signal may be lower than the actual engine RPM output from the cluster 130 based on the general RPM signal It may be appreciated from FIG. 2, in which the solid line represents a general RPM signal and the dotted line represents the general RPM signal plus a virtual RPM signal, that according to the related art, the engine RPM output to the cluster 130 is subjected to the damping processing even when the transmission 110 is in the upshift state and therefore is decreased at a smooth gradient.

On the other hand, according to the exemplary embodiment of the present inventive concept, the engine RPM output to the cluster 130 decreases to a more sudden gradient than the related art by the virtual RPM signal which is input from the TCU 120 when the transmission 110 is in the upshift state. Further, it may be appreciated that after the transmission is in the upshift state, the actual engine RPM depending on the general RPM signal input from the engine control unit 140 is output. By the above configuration, when the transmission 110 is upshifted, characteristics that the engine RPM is actually suddenly decreased may be implemented on the cluster 130.

According to the exemplary embodiment of the present inventive concept having the structure as described above, it is possible to improve the marketability of the vehicle by maximizing the engine RPM display responsiveness depending on the shift state of the transmission so as to allow the driver to visually confirm the ideal engine RPM.

Although the present inventive concept has been shown and described with respect to exemplary embodiment, it will be obvious to those skilled in the art that the present disclosure may be variously modified and altered without departing from the spirit and scope of the present disclosure as defined by the following claims.

What is claimed is:

1. An apparatus for displaying an engine revolutions per minute (RPM), comprising:
   an engine control unit (ECU) configured to output a general RPM signal;
   a transmission control unit (TCU) configured to output a shift signal and a virtual RPM signal based on a shift state of a transmission; and
   a cluster configured to output the engine RPM based on the virtual engine RPM signal when the shift signal is input and to output the engine RPM based on the general RPM signal when the shift signal is not input,
   wherein the cluster receives the general RPM signal from the ECU and outputs an actual engine RPM based on the general RPM signal when the shift signal is not input.

2. The apparatus of claim 1, wherein the TCU outputs the shift signal and the virtual RPM signal to the cluster when the shift state is upshifted.

3. The apparatus of claim 1, wherein the cluster outputs the virtual engine RPM based on the virtual RPM signal when the shift signal is input.

4. The apparatus of claim 3, wherein the virtual engine RPM tracks a target engine RPM from a current engine RPM as a preset gradient, and
   the target engine RPM is lower than the current engine RPM.

5. The apparatus of claim 1, wherein the virtual engine RPM output from the cluster based on the virtual RPM signal is lower than the actual engine RPM output from the cluster based on the general RPM signal.

6. The apparatus of claim 1, wherein the cluster is connected to the TCU and the ECU via a communication bus terminal to provide controller area network (CAN) communication.

* * * * *